US012779645B2

(12) United States Patent
Franz et al.

(10) Patent No.: US 12,779,645 B2
(45) Date of Patent: Nov. 3, 2026

(54) DRIVING-IN APPARATUS AND METHOD

(71) Applicant: Hilti Aktiengesellschaft, Schaan (LI)

(72) Inventors: Karl Franz, Oppenweiler (DE); Philipp Ellmann, Schaan (LI); Rene Wohlwend, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/708,285

(22) PCT Filed: Dec. 8, 2022

(86) PCT No.: PCT/EP2022/085012
§ 371 (c)(1),
(2) Date: May 8, 2024

(87) PCT Pub. No.: WO2023/117467
PCT Pub. Date: Jun. 29, 2023

(65) Prior Publication Data

US 2025/0025995 A1 Jan. 23, 2025

(30) Foreign Application Priority Data

Dec. 23, 2021 (EP) .................................... 21217420

(51) Int. Cl.
*B25C 1/06* (2006.01)
*B25C 1/04* (2006.01)

(52) U.S. Cl.
CPC ................ *B25C 1/06* (2013.01); *B25C 1/044* (2013.01); *B25C 1/047* (2013.01)

(58) Field of Classification Search
CPC .......... B25C 1/06; B25C 1/044; B25C 1/047; B25C 1/04; B25C 1/08; B25C 1/008; B25C 1/14
See application file for complete search history.

(56) References Cited

U.S. PATENT DOCUMENTS

| | | | |
|---|---|---|---|
| 8,561,869 | B2 | 10/2013 | Towfighi |
| 10,259,110 | B2 | 4/2019 | Bruggmueller et al. |

(Continued)

FOREIGN PATENT DOCUMENTS

| | | | |
|---|---|---|---|
| DE | 102005000107 | A1 | 3/2014 |
| EP | 2851157 | A1 | 3/2015 |
| WO | WO 2020214558 | A1 | 10/2020 |

OTHER PUBLICATIONS

International Searching Authority, International Search Report in International Application No. PCT/EP2022/085012, mailed Mar. 14, 2023.

(Continued)

*Primary Examiner* — Veronica Martin
(74) *Attorney, Agent, or Firm* — Qubit IP, PLLC

(57) ABSTRACT

An apparatus and a method for driving a fastening element into a base material, the apparatus having a bolt receptacle for the fastening element and a driving-in element which is moved toward the bolt receptacle between a starting position and a setting position, the apparatus having a cylindrical container which defines a cylinder axis, the driving-in element comprising a piston which is arranged in the cylindrical container such that it can be moved along the cylinder axis, with the result that the piston closes off a part volume of the cylindrical container, and a gas which is arranged in the closed-off part volume of the cylindrical container forms a gas spring, the cylindrical container being moved toward the bolt receptacle along the cylinder axis in order to tension the gas spring when the driving-in element is situated in the starting position.

19 Claims, 6 Drawing Sheets

(56) References Cited

U.S. PATENT DOCUMENTS

Figure 1:
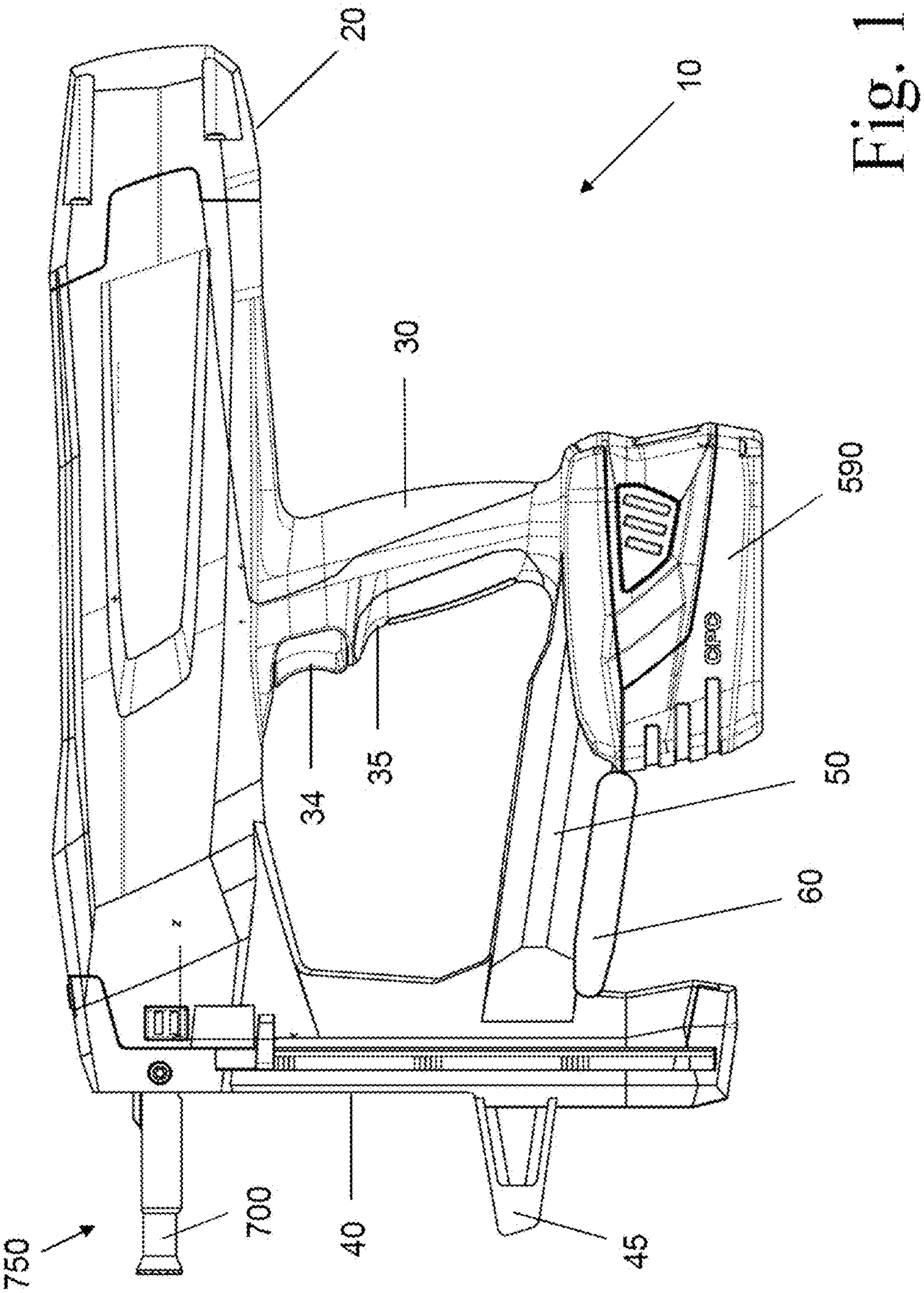

| | | | |
|---|---|---|---|
| 2007/0045377 | A1 | 3/2007 | Towfighi |
| 2015/0202755 | A1 | 7/2015 | Tanji |
| 2016/0207186 | A1 | 7/2016 | Bruggmueller et al. |
| 2017/0100829 | A1 * | 4/2017 | Pedicini .................. B25C 1/047 |
| 2023/0150101 | A1 | 5/2023 | Hietpas et al. |

OTHER PUBLICATIONS

International Searching Authority, Written Opinion in International Application No. PCT/EP2022/085012, mailed Mar. 14, 2023.

* cited by examiner

DRIVING-IN APPARATUS AND METHOD

CROSS-REFERENCE TO RELATED APPLICATIONS

This patent application is the U.S. National Stage of International Patent Application No. PCT/EP2022/085012, filed Dec. 8, 2022, which claims the benefit of European Patent Application No. 21217420.5, filed Dec. 23, 2021, which are each incorporated by reference.

TECHNICAL FIELD

The application relates to an apparatus and a method for driving a fastening element into a base material.

PRIOR ART

It is known in the case of apparatuses and methods of this type for mechanical energy to be stored temporarily in a mechanical energy store such as a driving-in spring, and to be transmitted abruptly to a fastening element. An amount of energy which is transmitted to the fastening element is called driving-in energy. An energy transmission element, for example in the form of a ram, is usually used, which energy transmission element is arranged in a driving-in direction between the mechanical energy store and the fastening element and moves to and fro.

Driving-in springs are known which operate in accordance with the principle of a gas spring. In order to tension driving-in springs of this type, the energy transmission element is pushed into a container of the gas spring. In order to be driven, the energy transmission element in some circumstances requires a specific geometry which can impair a mechanical robustness of the energy transmission element.

SUMMARY OF THE INVENTION

The object is achieved in the case of an apparatus for driving a fastening element into a base material, having a bolt receptacle for the fastening element and a driving-in element which can be moved toward the bolt receptacle between a starting position and a setting position, wherein the apparatus has a cylindrical container which defines a cylinder axis, and wherein the driving-in element comprises a piston which is arranged in the cylindrical container such that it can be moved along the cylinder axis, with the result that the piston closes off a part volume of the cylindrical container, and a gas which is arranged in the closed-off part volume of the cylindrical container forms a gas spring. In order to tension the gas spring, the cylindrical container can be moved toward the bolt receptacle along the cylinder axis when the driving-in element is situated in the starting position.

One advantageous embodiment is characterized by a drive which drives the cylindrical container toward the bolt receptacle along the cylinder axis from a relieved position into a tensioned position in order to tension the gas spring. The drive preferably also drives the cylindrical container from the tensioned position into the relieved position. The cylindrical container particularly preferably comprises a driver which drives the driving-in element from the setting position into the starting position. A further advantageous embodiment is characterized by an electric energy store such as an accumulator or a battery which supplies the drive with electrical energy.

One advantageous embodiment is characterized by a coupling device for temporarily holding the driving-in element fixedly in the starting position. The coupling device preferably comprises a locking element which can be moved transversely with respect to the cylinder axis, an inner sleeve which is oriented along the cylinder axis with a cutout which runs transversely with respect to the setting axis for receiving the locking element, and an outer sleeve which engages around the inner sleeve with a supporting surface for supporting the locking element.

The supporting surface is particularly preferably inclined by an acute angle with respect to the cylinder axis. The coupling device likewise preferably comprises a restoring spring which loads the outer sleeve with a force in the direction of the cylinder axis. The driving-in element likewise preferably has a depression, into which the locking element engages, in order to hold the driving-in element fixedly in the starting position. The cylindrical container likewise preferably has an actuating element which actuates the coupling device.

The object is likewise achieved in the case of a method for driving a fastening element into a base surface, by means of an apparatus having a bolt receptacle for the fastening element and a driving-in element which can be moved toward the bolt receptacle between a starting position and a setting position, wherein the apparatus has a cylindrical container which defines a cylinder axis, and wherein the driving-in element comprises a piston which is arranged in the cylindrical container such that it can be moved along the cylinder axis, with the result that the piston closes off a part volume of the cylindrical container, and a gas which is arranged in the closed-off part volume of the cylindrical container forms a gas spring. The cylindrical container is moved toward the bolt receptacle along the cylinder axis in order to tension the gas spring, while the driving-in element is situated in the starting position.

EXEMPLARY EMBODIMENTS

Figure 2:
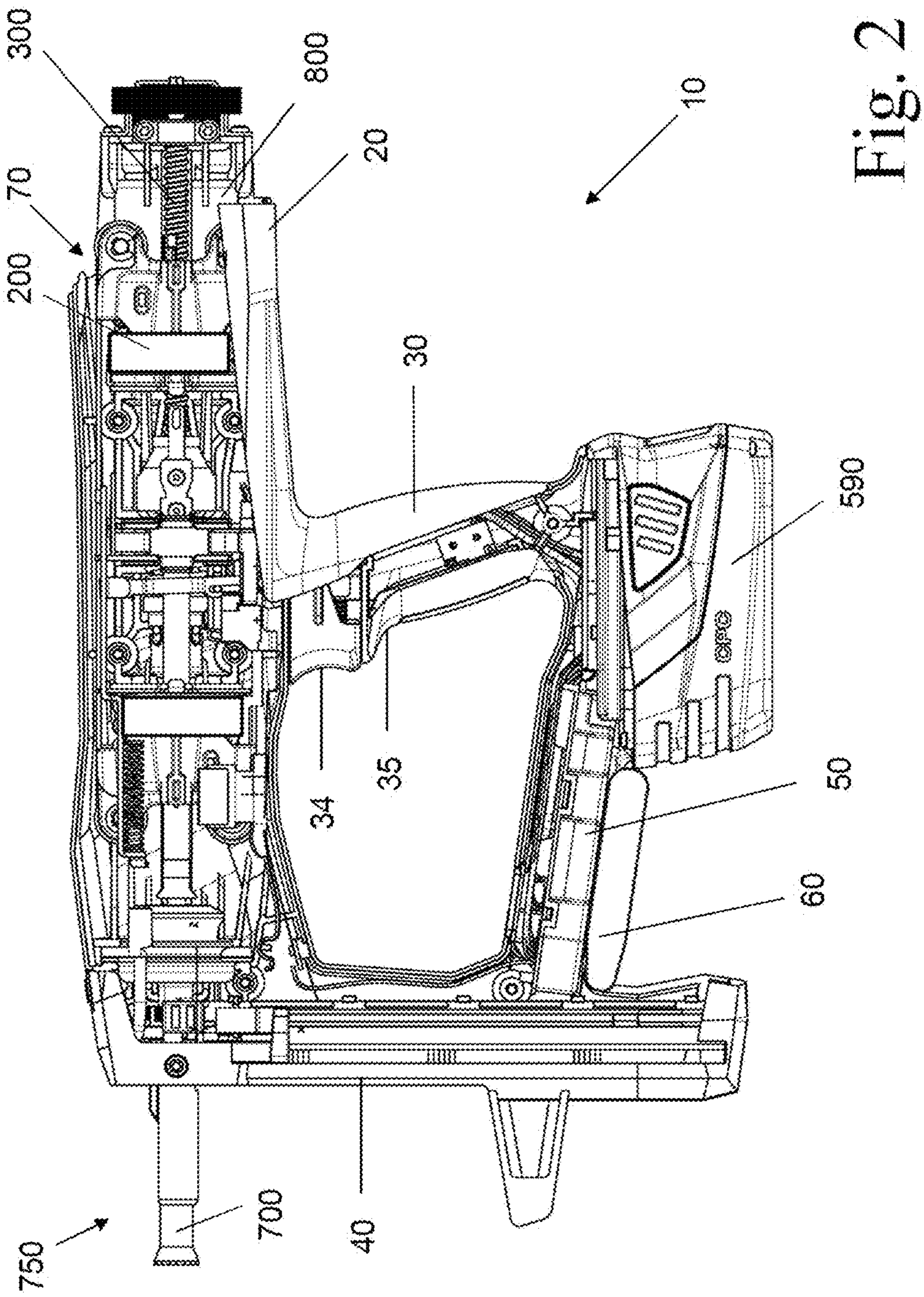
Figure 3:
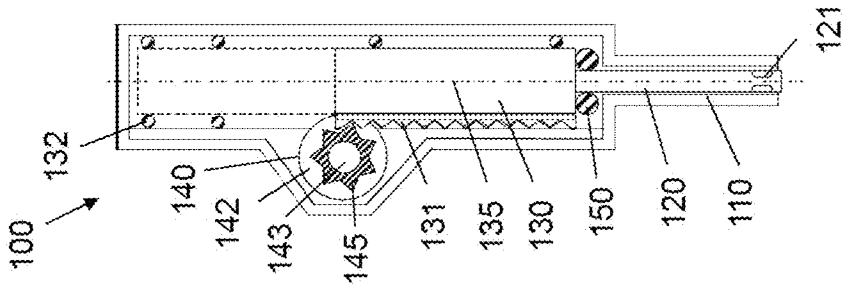
Figure 4:
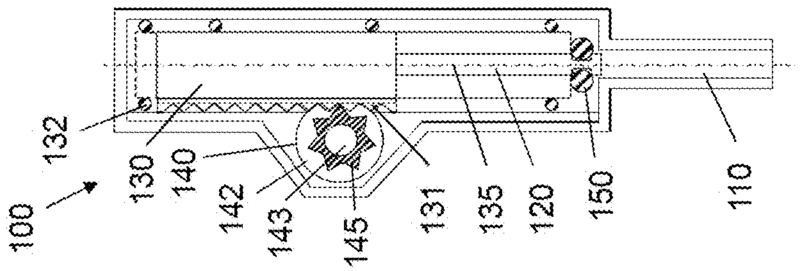
Figure 5:
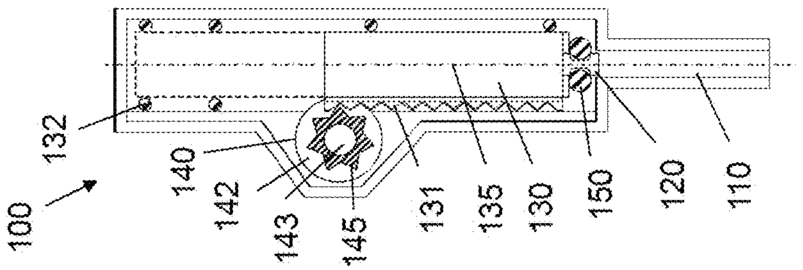
Figure 6:
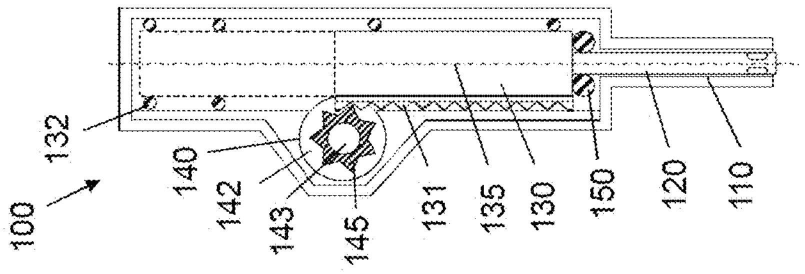
Figure 8:
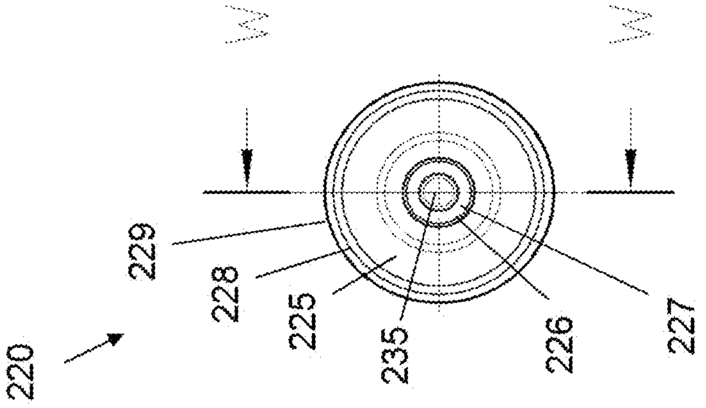
Figure 7:
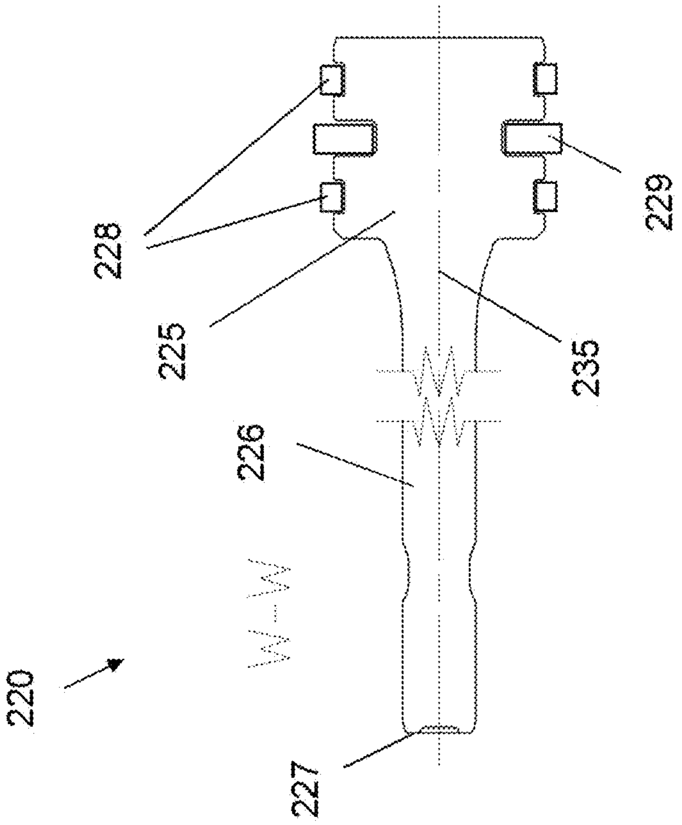
Figure 9:
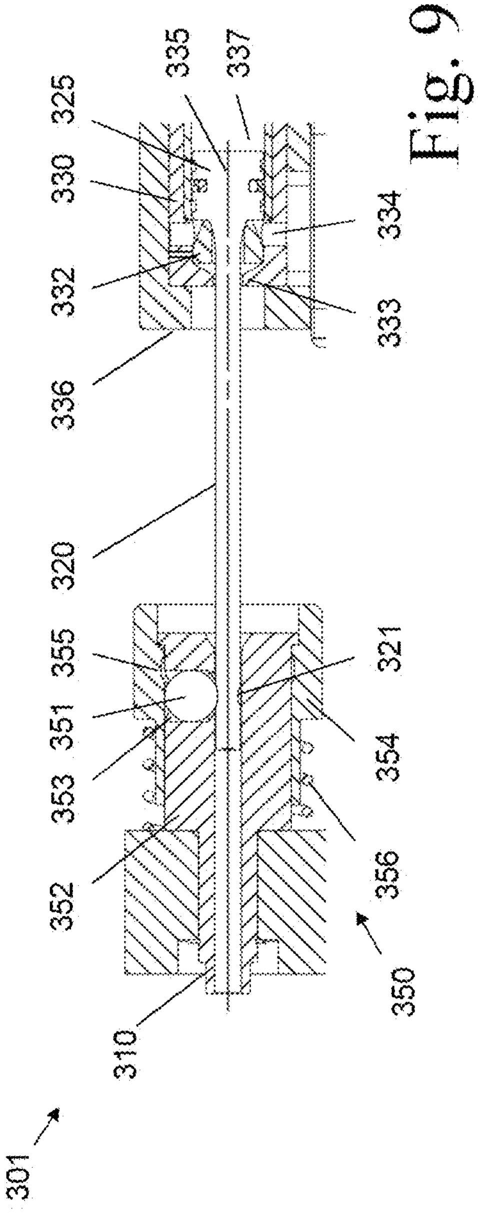
Figure 10:
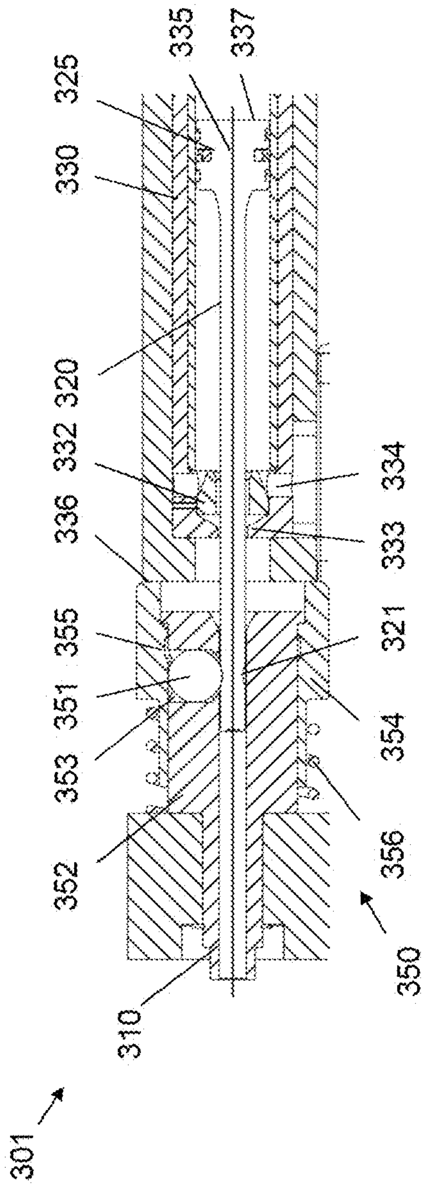
Figure 11:
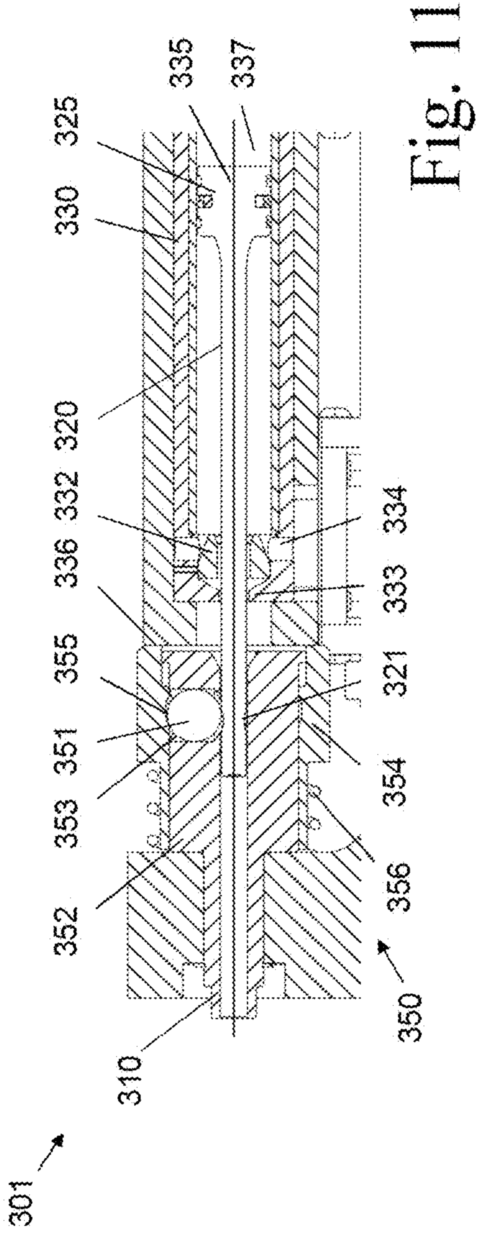
Figure 12:
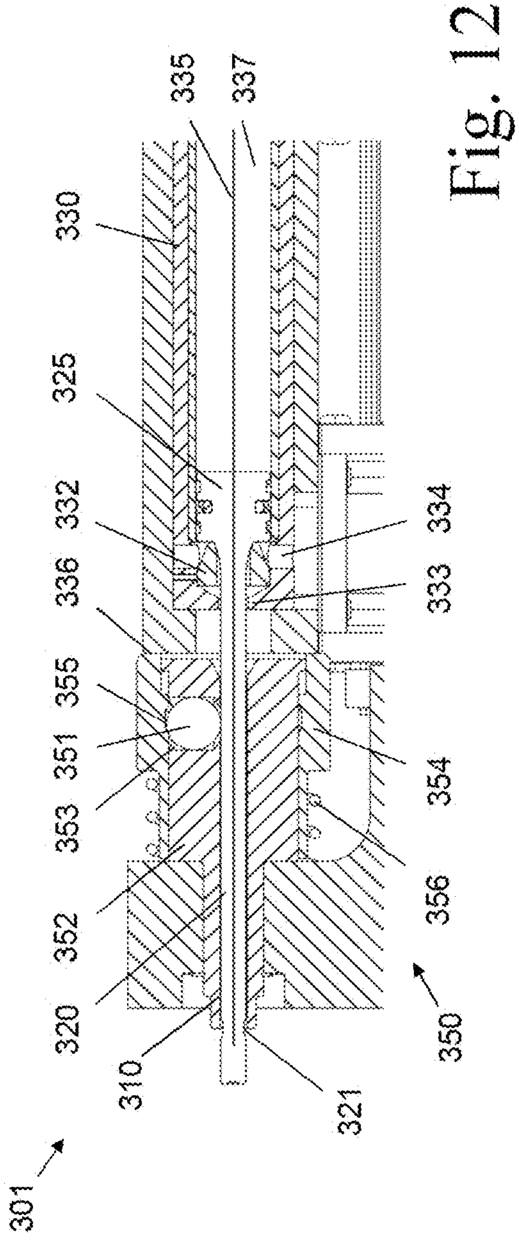

Embodiments of an apparatus for driving a fastening element into a base surface are explained in more detail in the following text by way of examples and with reference to the drawings, in which:

FIG. 1 shows a side view of a driving-in apparatus,

FIG. 2 shows a side view of the driving-in apparatus with an opened housing, FIG. 3 diagrammatically shows a driving-in apparatus, FIG. 4 diagrammatically shows the driving-in apparatus from FIG. 3, FIG. 5 diagrammatically shows the driving-in apparatus from FIG. 3, FIG. 6 diagrammatically shows the driving-in apparatus from FIG. 3, FIG. 7 shows a driving-in element in a longitudinal section, FIG. 8 shows the driving-in element from FIG. 7 in a plan view, FIG. 9 shows a longitudinal section of a detail of a driving-in apparatus, FIG. 10 shows the longitudinal section of the detail of the driving-in apparatus from FIG. 9, FIG. 11 shows the longitudinal section of the detail of the driving-in apparatus from FIG. 9, and FIG. 12 shows the longitudinal section of the detail of the driving-in apparatus from FIG. 9.

FIG. 1 shows a side view of a driving apparatus 10 for driving a fastening element, for example a nail or bolt, into a base material. The driving-in apparatus 10 has a driving-in element (not shown) for the transmission of energy to the fastening element, and a housing 20, in which the driving-in element and a conveying device (likewise not shown) for conveying the driving-in element are received.

Furthermore, the driving-in apparatus 10 has a handle 30, a magazine 40 and a bridge 50 connecting the handle 30 to the magazine 40. Attached to the bridge 50 are a scaffold hook 60 for suspending the driving-in apparatus 10 on a scaffold or the like, and an electrical energy store designed as an electrical storage battery 590. Arranged on the handle 30 are a trigger 34 and a grip sensor in the form of a manual switch 35. Furthermore, the driving-in apparatus 10 has a guide channel 700 for guidance of the fastening element, and a pressing device 750 for detecting whether the driving-in apparatus 10 is pressed onto a base surface (not shown). An orientation of the driving-in apparatus perpendicularly with respect to the base surface is assisted by an orientation aid 45.

FIG. 2 shows the driving-in apparatus 10 with the housing 20 open. A conveying device 70 for conveying an energy transmission element which is concealed in the drawing is received in the housing 20. The conveying device 70 comprises a diagrammatically shown gas spring 200 and a drive 300 for tensioning the gas spring 200, for example by means of a spindle drive. The drive 300 comprises an electric motor 800 for converting electrical energy from the storage battery 590 into rotational energy.

FIGS. 3 to 6 diagrammatically show an apparatus 100 for driving a fastening element into a base surface in sequential operating phases. The apparatus 100 has a bolt receptacle 110 for fastening elements (not shown) which are configured, for example, as nails, bolts, pins or rivets. Furthermore, the apparatus 100 has a driving-in element 120 which can be moved toward the bolt receptacle 110 between a starting position (FIGS. 4 and 5) and a setting position (FIGS. 3 and 6). On its periphery in the vicinity of its end which faces the bolt receptacle 110, the driving-in element 120 has a periphery-side and circumferential depression 121.

Furthermore, the apparatus 100 has a cylindrical container 130 which defines a cylinder axis 135. The cylindrical container 130 has projections 131 which are arranged behind one another in the direction of the cylinder axis 135 in the manner of a rack on an outer side of the cylindrical container 130. The driving-in element 120 has a piston (not shown) which is arranged in the cylindrical container 130 such that it can be moved along the cylinder axis 135. In this way, the piston closes off an upper (in FIGS. 3 to 6) part volume of the cylindrical container 130, in which part volume a gas spring is formed from a gas, for example air. The cylindrical container 130 is of double-walled construction. In the case of exemplary embodiments which are not shown, the cylindrical container is of single-walled construction.

Furthermore, the apparatus 100 has a drive 140 with a motor 142 and a gearwheel 145, the gearwheel 145 being attached fixedly on a motor shaft 143 of the motor 142 for conjoint rotation. The gearwheel 145 engages with its teeth between the projections 131 of the cylindrical container 130, with the result that a rotational movement of the motor shaft 143 is converted into a linear movement of the cylindrical container 130 along the cylinder axis 135 toward the bolt receptacle 110 and/or away from the bolt receptacle 110. Guide elements 132 serve for guidance of the cylindrical container 130 during a linear movement of this type along the cylinder axis 135 between a tensioned position (FIGS. 3, 5 and 6) and a relieved position (FIG. 4).

The drive 140 is supplied with electrical energy by an electrical energy store (not shown) such as an accumulator or a battery. Furthermore, the apparatus 100 has a coupling device 150 for temporarily holding the driving-in element 120 fixedly in the starting position.

A method for driving a fastening element into a base surface by way of the apparatus 100 comprises the following steps. First of all (FIG. 3), for example after the apparatus 100 is switched on or a driving-in operation has taken place, the driving-in element 120 is situated in the setting position, and the cylindrical container 130 is situated in the tensioned position. Since the driving-in element 120 is situated in the setting position, the gas spring in the cylindrical container 130 is in a relieved state.

In a first step (FIG. 4), the motor 142 drives the motor shaft 143 and therefore the gearwheel 145 counter to the clockwise direction. By means of the engagement of the gearwheel 145 between the projections 131, the cylindrical container 130 is conveyed into the relieved position. At the same time, the driving-in element 120 is conveyed into the starting position by means of a driver (not shown). The coupling device 150 engages into the depression 121 on the driving-in element 120, in order to temporarily hold the driving-in element 120 fixedly in the starting position.

In a following, in particular directly following step (FIG. 5), the motor 142 drives the motor shaft 143 and therefore the gearwheel 145 in the clockwise direction. The cylindrical container 130 is conveyed into the tensioned position by means of the engagement of the gearwheel 145 between the projections 131, while the driving-in element 120 is held fixedly in the starting position by the coupling device 150. As a result, the gas spring which is situated in the closed-off part volume above the piston of the driving-in element 120 is compressed and tensioned. By virtue of the fact that the driving-in element 120 does not move during the tensioning operation, it is possible for the gas spring to be relieved by way of the reversed movement of the cylindrical container, without moving the driving-in element 120. Therefore, it is possible, for example, for a clamping fastening element to be removed from the bolt receptacle 110, without an accidental acceleration of the driving-in element 120 toward the bolt receptacle being feared.

In a further following, in particular directly following step (FIG. 6), a trigger (not shown), for example the trigger 34 which is shown in FIG. 1, is pulled by a user of the apparatus 100. As a result, the coupling device 150 releases the driving-in element 120, while the cylindrical container 130 is held fixedly in the tensioned position by the gearwheel 145. As a result, the driving-in element 120 is accelerated toward the bolt receptacle 110 by the relieving gas spring, in order to drive a fastening element arranged therein into the base surface.

In the case of exemplary embodiments which are not shown, a cam drive, a spindle drive and/or a worm gear mechanism are/is used instead of the gearwheel drive with or without a gear mechanism. In particular, the cylindrical container itself has a thread and is driven like a spindle, for example by a recirculating ball nut.

FIGS. 7 and 8 show a driving-in element 220 in a longitudinal section (FIG. 7) and in a plan view (FIG. 8). The driving-in element 220 comprises a piston 225 and a piston rod 226 which protrudes from the piston 225 along a cylinder axis 235. A front-side end 227 of the piston rod 226 is provided to strike a fastening element, in order to drive the latter into a base surface. For improved guidance of the fastening element, the front-side end 227 has a guide contour.

The piston 225 has two guide elements 228, arranged in each case in a circumferential groove, and a seal 229 which is likewise arranged in a circumferential groove. The guide elements 228 are of annular configuration and serve for a guided movement of the piston 225 within a cylindrical container (not shown). The seal 229 is likewise of annular configuration and serves for a sealed movement of the piston 225 within the cylindrical container.

As can be seen in FIG. 8, in particular, the driving-in element 220 has a rotationally symmetrical shape and is of more robust construction than a driving-in element with a drive contour such as, for example, a rack. In the present concept, a drive contour is situated on the cylindrical container, where far lower forces act than on the piston. Moreover, substantially no tilting forces act on the driving-in element. Overall, a long service life is achieved for the driving-in element.

FIGS. 9 to 12 show details in a longitudinal section of a further exemplary embodiment of an apparatus 301 for driving a fastening element into a base surface in sequential operating phases. The apparatus 301 has a bolt receptacle 310, a driving-in element 320 which can be moved toward the bolt receptacle 310 between a starting position (FIGS. 9 to 11) and a setting position (FIG. 12) with a periphery-side and circumferential depression 321, and a cylindrical container 330 with a cylinder axis 335. The driving-in element 320 comprises a piston 325 which is arranged in the cylindrical container 330 such that it can be moved along the cylinder axis 335. Therefore, the piston 325 closes off a right-hand (in FIGS. 9 to 12) part volume of the cylindrical container 330, in which part volume a gas spring 337 is formed.

The gas spring 337 is preferably already under a preliminary pressure of, for example, 80 bar in the relieved state. In the tensioned state of the gas spring, the pressure is then 150 bar, for example. On account of the high preliminary pressure, a compact overall design of the apparatus is possible even in the case of a high driving-in energy. The driving-in element 320 and a cylindrical container 330 preferably jointly form one unit which can be exchanged simply, in order to counteract, for example, a possible piston fracture, tip wear or seal wear and an associated power loss, or in order to modify the driving-in energy by means of different gas springs and to open up additional fields of application. Mounting and dismantling of the cylindrical container and possibly the driving-in element preferably takes place on that side of a housing of the apparatus which faces away from the bolt receptacle.

On its end side 336 which faces the bolt receptacle 310, the cylindrical container 330 has a driver 332 which drives the driving-in element 320 from its setting position into the starting position. Moreover, the driver 332 serves as a buffer for the driving-in element 320 and to this end comprises an elastic material such as an elastomer, for example. Furthermore, on its end side 336 which faces the bolt receptacle 310, the cylindrical container 330 has a guide element 333 for the driving-in element and ventilation openings 334. The cylindrical container 330 is closed on the end side which faces away from the bolt receptacle 310.

The apparatus 301 has a coupling device 350 for temporarily holding the driving-in element 120 fixedly in the starting position. The coupling device 350 comprises three spherical locking elements 351 which can be moved transversely with respect to the cylinder axis 335, and an inner sleeve 352 which is oriented along the cylinder axis 335 with three cutouts 353 which run transversely with respect to the cylinder axis 335. The locking elements 351 are received in each case in one of the cutouts 353 and engage into the circumferential depression 321 of the driving-in element 320, in order to hold the driving-in element 320 fixedly in the starting position. The locking elements 351 are preferably distributed uniformly around the cylinder axis 335. In the case of exemplary embodiments which are not shown, the coupling device comprises one, two, four or more locking elements.

Furthermore, the coupling device 350 comprises an outer sleeve 354 which engages around the inner sleeve 352 with a circumferential supporting surface 355 for radially inwardly directed support of the locking elements 351. The supporting surface 355 is inclined by an acute angle with respect to the cylinder axis 335. Furthermore, the coupling device 350 comprises a restoring spring 356 which loads the outer sleeve 354 with a force in the direction of the cylinder axis 335. That end side 336 of the cylindrical container 330 which faces the bolt receptacle 310 forms an actuating element which actuates the coupling device 350.

During a movement for driving a fastening element into a base surface by way of the apparatus 301, the cylindrical container 330 is first of all conveyed into the relieved position (FIG. 9). At the same time, the driving-in element 320 is conveyed into the starting position by means of the driver 332. The locking elements 351 then engage into the circumferential depression 321 on the driving-in element 320 and hold the driving-in element 320 fixedly in the starting position. To this end, the locking elements 351 are supported by the outer sleeve 354 against the movement radially to the outside, the outer sleeve 354 for its part being preloaded by the restoring spring 356 into the position which is shown in FIG. 9.

In a following step (FIG. 10), the cylindrical container 330 is conveyed into the tensioned position, while the driving-in element 320 is held fixedly in the starting position by the coupling device 350. As a result, the gas spring 337 which is situated to the right of the piston 325 in the closed-off part volume is compressed and tensioned. The end side 336 of the cylindrical container 330 then bears axially against the outer sleeve 354. The coupling device 250 remains in its position during this operation.

In a further following step (FIG. 11), triggered by a trigger (not shown) of the apparatus 301 being pulled, the cylindrical container 330 is moved further toward the bolt receptacle 310 by a triggering distance of, for example, a few millimeters. As a result, the cylindrical container 330 actuates, by way of its end side 336 which acts as an actuating element, the coupling device 350, by the end side 336 moving the outer sleeve 354 toward the bolt receptacle 310 counter to a restoring force of the restoring spring 356. As soon as the supporting surface 355 which is inclined with respect to the cylinder axis 335 leaves sufficient movement clearance radially to the outside for the locking elements 351, the locking elements 351 release the driving-in element 320. In the case of exemplary embodiments which are not shown, the coupling device is released mechanically by pulling of the trigger. In the case of further exemplary embodiments which are not shown, the coupling device comprises a latch which is arranged in front of an end side, facing the bolt receptacle, of the driving-in element, which latch is moved out of the movement path of the driving-in element by pulling of the trigger, in order to release the driving-in element.

Directly following this (FIG. 12), the driving-in element 320 which is therefore released is accelerated toward the bolt receptacle 310 by the relieving gas spring, in order to drive a fastening element arranged therein into the base surface. Excess kinetic energy of the driving-in element 320 is finally absorbed by the elastic driver 332.

In one exemplary embodiment which is not shown, a driving-in apparatus additionally has a spacer element which is arranged between the cylindrical container and the coupling device. By means of an operating element such as, for example, an adjusting wheel, an axial position of the spacer element relative to the coupling device can be set, in order to influence the tensioned position of the cylindrical container and therefore the compression of the gas spring.

In a further exemplary embodiment which is not shown, a driving-in apparatus has a friction brake which removes energy from the driving-in element by way of friction, in order to adjust the driving-in energy. By way of regulation of the force, with which the friction brake bears against the moved driving-in element, the driving-in energy can be set to a desired value.

The invention has been explained above on the basis of a number of exemplary embodiments of a driving-in apparatus. Here, the described features can be transferred from each exemplary embodiment to all other exemplary embodiments individually or in combination, as long as they are consistent with one another. It should be noted that the apparatus according to the invention can also be used for other purposes.

The invention claimed is:

1. An apparatus for driving a fastening element into a base material, the apparatus having a bolt receptacle for the fastening element and a driving-in element which can be moved toward the bolt receptacle between a starting position and a setting position, wherein the apparatus has a cylindrical container which defines a cylinder axis, wherein the driving-in element comprises a piston which is arranged in the cylindrical container such that the piston can be moved along the cylinder axis, which results in the piston closing off a part volume of the cylindrical container, and a gas which is arranged in a closed-off part volume of the cylindrical container forming a gas spring, wherein the cylindrical container can be moved along the cylinder axis toward the bolt receptacle in order to tension the gas spring when the driving-in element is situated in the starting position, the apparatus further having a drive which drives the cylindrical container toward the bolt receptacle in order to tension the gas spring along the cylinder axis from a relieved position into a tensioned position.

2. The apparatus as claimed in claim 1, the drive driving the cylindrical container from the tensioned position into the relieved position.

3. The apparatus as claimed in claim 2, the cylindrical container comprising a driver which drives the driving-in element from the setting position into the starting position.

4. The apparatus as claimed in claim 1, having, furthermore, an electrical energy store which supplies the drive with electrical energy.

5. The apparatus as claimed in claim 1, having, furthermore, a coupling device for temporarily holding the driving-in element fixedly in the starting position.

6. The apparatus as claimed in claim 5, the coupling device comprising a locking element having a spherical surface which can be moved transversely with respect to the cylinder axis, an inner sleeve which is oriented along the cylinder axis with a cutout which runs transversely with respect to a setting axis for receiving the locking element, and an outer sleeve which engages around the inner sleeve with a supporting surface for supporting the locking element.

7. The apparatus as claimed in claim 6, the supporting surface being inclined by an acute angle with respect to the cylinder axis.

8. The apparatus as claimed in claim 6, the coupling device comprising, furthermore, a restoring spring which loads the outer sleeve with a force in a direction of the cylinder axis.

9. The apparatus as claimed in claim 6, the driving-in element having a depression, into which the locking element engages, in order to hold the driving-in element fixedly in the starting position.

10. The apparatus as claimed in claim 5, the cylindrical container further comprising an actuating element having a contact surface which actuates the coupling device.

11. The apparatus as claimed in claim 2, having, furthermore, an electrical energy store which supplies the drive with electrical energy.

12. The apparatus as claimed in claim 1, having, furthermore, a coupling device for temporarily holding the driving-in element fixedly in the starting position.

13. The apparatus as claimed in claim 12, the coupling device comprising a locking element having a spherical surface which can be moved transversely with respect to the cylinder axis, an inner sleeve which is oriented along the cylinder axis with a cutout which runs transversely with respect to a setting axis for receiving the locking element, and an outer sleeve which engages around the inner sleeve with a supporting surface for supporting the locking element.

14. The apparatus as claimed in claim 13, the supporting surface being inclined by an acute angle with respect to the cylinder axis.

15. The apparatus as claimed in claim 7, the coupling device comprising, furthermore, a restoring spring which loads the outer sleeve with a force in a direction of the cylinder axis.

16. The apparatus as claimed in claim 7, the driving-in element having a depression, into which the locking element engages, in order to hold the driving-in element fixedly in the starting position.

17. The apparatus as claimed in claim 6, the cylindrical container further comprising an actuating element having a contact surface which actuates the coupling device.

18. The apparatus as claimed in claim 3, having, furthermore, an electrical energy store which supplies the drive with electrical energy.

19. A method for driving a fastening element into a base material, by an apparatus having a bolt receptacle for the fastening element and a driving-in element which can be moved toward the bolt receptacle between a starting position and a setting position, the apparatus having a cylindrical container which defines a cylinder axis, the driving-in element comprising a piston which is arranged in the cylindrical container such that the piston can be moved along the cylinder axis, which results in the piston closing off a part volume of the cylindrical container, and a gas which is arranged in a closed-off part volume of the cylindrical container forming a gas spring, the cylindrical container being moved toward the bolt receptacle along the cylinder axis in order to tension the gas spring, while the driving-in element is situated in the starting position, and the apparatus further having a drive which drives the cylindrical container toward the bolt receptacle in order to tension the gas spring along the cylinder axis from a relieved position into a tensioned position.

* * * * *